Patented May 18, 1943

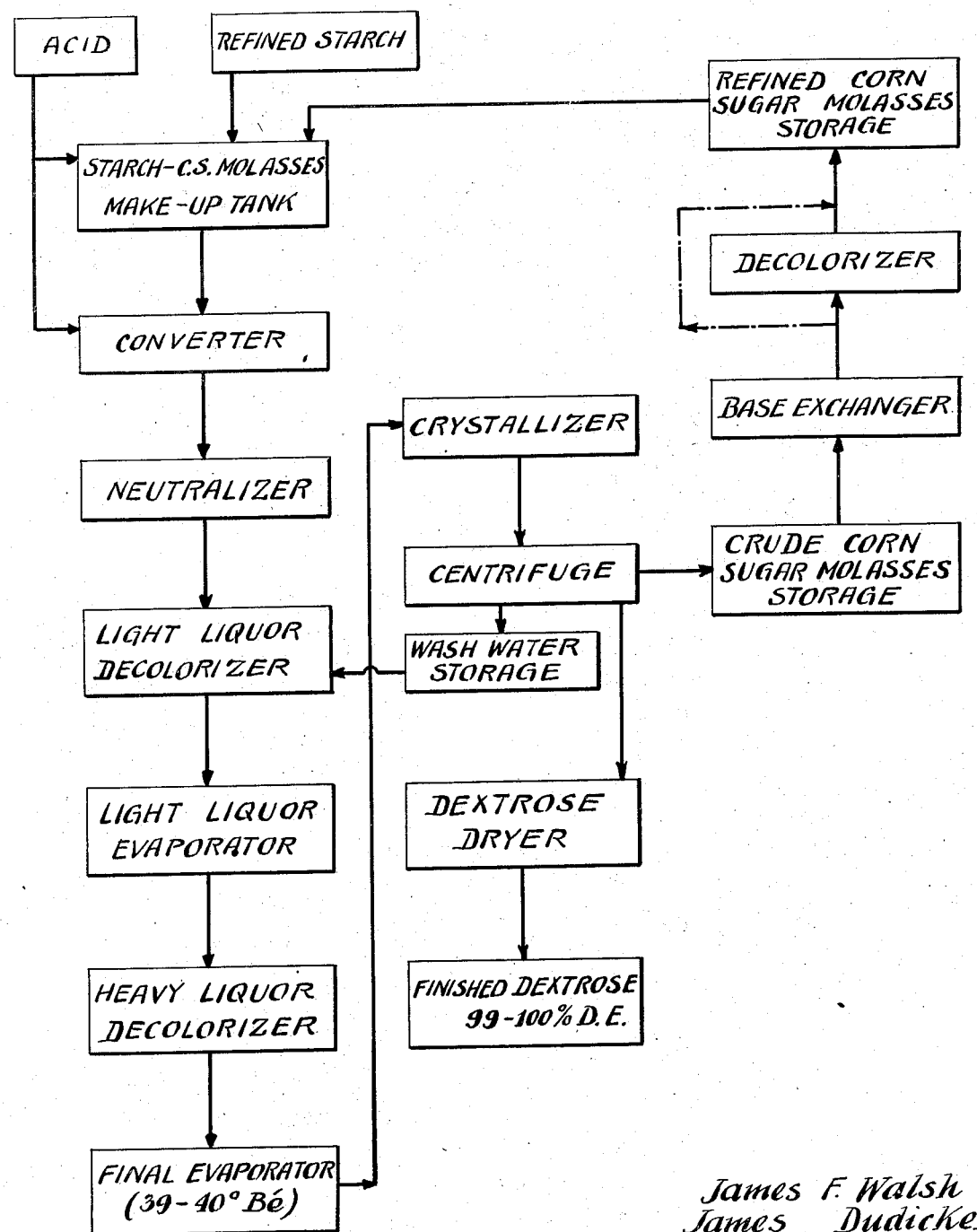

2,319,648

UNITED STATES PATENT OFFICE 2,319,648

PROCESS OF MAKING DEXTROSE

James F. Walsh, Yonkers, N. Y., and James Dudicker, Hammond, Ind., assignors to American Maize-Products Company, a corporation of Maine Application September 25, 1940, Serial No. 358,272

5 Claims. (Cl. 127—40)

This invention relates to a method of making dextrose. More particularly, the invention relates to the conversion of starch crystallized dextrose with much higher yields than have been possible heretofore.

In the usual method of making dextrose, starch is suspended in water, hydrolyzed with acid, the resulting syrup neutralized to the desired pH, and the syrup then decolorized and evaporated to a suitable concentration for subsequent crystallization of dextrose. The concentrated syrup is then allowed to cool so that as much as possible of the dextrose present is crystallized. The remaining mother liquor is separated from the crystals, as by centrifuging, to give a crude molasses. The crystallized dextrose is ordinarily washed with water.

The molasses separated from the dextrose crystals, in this usual method for making dextrose, contains an important part of the total of the starch conversion products.

Attempts have been made to obtain increased yields of dextrose from starch conversion solutions, by either reconversion of the molasses or by repeated reconcentrations and recrystallizations of the molasses. Neither of these methods have proven practical in giving the desired yield of dextrose of satisfactory quality. Recoveries of dextrose have been low, the cost of processing high, and the time cycles involved excessively long in the recovery, the yields ranging from about 70 to 85% at the best, the material lost in the molasses being chiefly useful only in markets where the accumulated coloring matters, impurities, and bitter principles resulting from the process are acceptable in view of the low price obtained for the material.

Also, attempts have been made to utilize the starch sugar molasses, by returning it to the system as part of the total suspension going to conversion. Thus, it has been attempted to mix the molasses with fresh starch previous to conversion. This method of use has proven unsatisfactory, due to a substantial extent to the ash (inorganic salts) content which interferes with conversion and tends to inhibit satisfactory crystallization of dextrose, after repeated reuse of the molasses.

The present invention provides a method by which starch is converted to dextrose with excellent yields and the production of no substantial amount of low priced by-products. This result is accomplished by a method including treatment of the crude molasses so as to remove material which, if not removed, interferes with the conversion of the carbohydrates of the molasses to dextrose and subsequent crystallization of the dextrose.

Briefly stated, the invention comprises forming the crystallized dextrose and crude molasses as described above, treating the crude molasses so as to remove sodium and other metals present, reconverting the treated molasses, and crystallizing dextrose therefrom. In the preferred embodiment of the invention, the molasses refined by the removal of the metals is returned to the acid conversion step and there mixed with fresh starch in the standard process. According to the invention, the molasses are so purified that the solids therein do not interfere with the conversion of starch.

Once the process is operating regularly, the batch for acid conversion will contain not only fresh starch but also a certain amount of the refined molasses.

The water used to wash the crystallized dextrose is also utilized, as will appear later.

There is thus provided a process which is of the nature of a closed operation, only the desired crystallized dextrose being taken from the system in any substantial amount. As a result, loss of starch in the form of by-products is practically eliminated. It will be understood, however, that proteins are also produced and separated in substantial amounts, in this case the starchy material used as raw material contains much protein.

To remove from the molasses the sodium and other metals which, if present, interfere with the conversion of maltose, dextrins, and the like in the molasses or with subsequent crystallization of dextrose, there is used a base exchanger which has the property of removing from an aqueous solution, in this case the molasses, a large part of the alkali metal and other metals present in the solution in the form of their salts.

The most abundant of these metals in the molasses is ordinarily that one which is added in the form of an alkali compound to neutralize the starch conversion syrup. For this neutralizing step, there is commonly introduced an alkali metal alkali such, for example, as sodium carbonate. Potassium carbonate or a caustic alkali may be used for this purpose. There is no particular advantage to be gained, however, by the use of the relatively expensive potassium compounds or of the caustic alkalis which also are more expensive than the carbonate or which require some care in introduction and mixing.

Because of the amount of acid to be neutralized by the alkali metal alkali, the content of the salt of the alkali metal in the neutralized syrup is of the order of about 0.5 to 1% of the weight of dissolved solids. The proportion of such alkali metal in the syrup is, therefore, large in proportion to the amount of the other metals present.

It will be evident, also, that the alkali metal salt resulting from the neutralization of the acid employed in the conversion will remain dissolved and appear in the molasses separated from the dextrose crystals.

To remove the alkali metal and other interfering metals from the molasses, there is utilized preferably a base exchanger of special type, say, a hydrogen zeolite, the term zeolite being used herein to include the so-called "organolites." Among such base exchangers that may be used are those conventionally employed for removing sodium and other alkali metals from aqueous solutions of their salts, materials that function in part at least by the exchange of hydrogen for sodium or other metal. Such hydrogen zeolites frequently are slightly acidic, so as to give a pH somewhat below 7 in the molasses at the time that it is in contact with the zeolite.

In addition to the property of removing the major portion of sodium and other metals present in the molasses, the exchanger used should be non-color-throwing and a non-supporter of the growth of fungi and molds.

Among the zeolites that meet these general requirements and that have been used to advantage is the activated organic material produced by treatment of coal, lignite, or wood by the process described by Tiger in Transactions of the American Institute of Mechanical Engineers, 60, No. 11, 315–325 (1938). Such material is known commercially as Zeo-Karb H. This base exchanger has the capacity to remove various amounts up to about 7000 grains or somewhat more of sodium or other metals from solutions passed slowly over the material, for each cubic foot of the material. The Zeo-Karb H is preferably used under such conditions as to acidity that the solution in contact with the Zeo-Karb is acid to phenolphthalein, say of pH value below 8.3, preferably 4.5 to 6.

Another base exchanger that may be used to advantage is the product of the condensation of formaldehyde with one of the sulfonated phenols, either insolubilized or activated initially or regenerated by acid treatment.

Another base exchanger that may be used is one made as described in U. S. Patent 2,198,381 issued to Ellis.

The invention is not limited to the use of any one particular base exchanger. There may be used any of the commercial base exchangers which remove alkali metal from an aqueous solution of its salts and that do not introduce into the molasses solution treated any substantial amount of interfering water soluble by-products. Acidity is not considered an interfering substance, as acidity is compensated for in the amount of acid added for reconversion, or may be neutralized.

The base exchanger selected is preferably used in granular form and filled into a container or tower. The molasses to be purified is caused to flow slowly through the bed of the base exchanger, at such a rate that the time of contact with the base exchanger is substantial, say 1 to 4 hours.

The base exchanger is separated from the treated (refined) molasses, as by the passage of the molasses through and out of the container for the exchanger, as described.

For best results, the molasses are diluted before treatment with the base exchanger. Thus, the crude molasses may be diluted to about the same concentration, in terms of total solids, as prevails in the fresh starch suspension to which the molasses after the zeolite treatment are preferably added.

A typical example of the practice of the invention will be illustrated in connection with the attached drawing which shows a suitable sequence of steps in our method.

Starchy material, such as refined starch from potatoes, corn, wheat, or barley, or an impure material such as table head starch, is made into a suspension with water and converted by hydrolysis in the presence of acid. Thus, the starch may be made into an aqueous suspension of density about 12 to 16° Bé., hydrochloric acid added, and conversion under steam pressure effected, all in accordance with usual procedure.

During this conversion, dextrose is formed, the conditions of conversion selected giving as high a yield of dextrose as practicable without the introduction of objectionable decomposition and reversion products, such as excessive amounts of materials of bitter taste and undesired coloring material. Ordinarily there may be produced by the conversion a D. E. of about 90 to 93, this being the number of parts of dextrose for 100 parts of total solids. The total solids other than dextrose are principally maltose, dextrins, and impurities.

The converted material, constituting starch conversion syrup, is treated with sodium carbonate or other suitable alkali, ordinarily an alkali metal alkali, to adjust the pH to that desired. This is commonly called the neutralization step, the neutralization being effected in a typical procedure to the extent that the pH is raised to about 4.0 to 5.5.

During the neutralization, certain materials that coagulate on adjustment of the pH are separated, particularly the coagulable proteins and fats. These coagulated products are removed by filtration and thus made ready for sale, as for use in the compounding of feeds.

The filtrate from the coagulated material is ordinarily called light liquor.

The light liquor is decolorized in conventional manner, as by passage over animal or vegetable decolorizing carbon. The liquor is then concentrated, say, to about 30° Bé. in evaporators for light liquor, the concentration being carried to about 30 to 31 Bé.

The liquor after concentration is suitably decolorized again with animal or vegetable carbon. In any case, the liquor is concentrated finally to a very high degree, favoring the crystallization of the dextrose in as large proportion as possible when the highly concentrated liquor is cooled. For this reason, the final concentration may be continued in an evaporator until the density of the liquor is about 39 to 40° Bé.

The concentrated liquor is then transferred to a crystallizer, in which crystallization of dextrose is effected in usual manner. Thus, the concentrated liquor may be charged into the crystallizer which contains initially a certain amount of the massecuite from a previous crystallization, this massecuite serving to seed the new charge in the crystallizer. Ordinarily the crystallization proceeds for a considerable period of time, suitably 4 to 5 days during which time the temperature falls from about 120° to around 75° F.

The resulting massecuite, including crystals and molasses as the mother liquor, is centrifuged, the molasses being removed by the centrifugal action.

The dextrose crystals in the centrifuge are then washed with water, the first portion of the effluent being combined with the molasses fraction until the purity of the effluent becomes at least 85 D. E. When this stage is reached, then the later portions of wash water are diverted to a previous step in the process preceding the evaporation; suitably the wash water of 85 purity or more is added to the light liquor passing into the light liquor decolorizer.

When the water washing is completed, the dextrose is discharged from the centrifuge and dried, the dried material being ordinarily 99 to 100% D. E.

The crude molasses separated as described above is now treated to remove from the molasses substances which interfere with the conversion of solids to dextrose. The molasses is first diluted, if desired to lower the viscosity, say to about 12 to 16 Bé., and is caused to pass slowly over the base exchanger of the kind described. The base exchanger is supported to advantage in a tall vessel and the crude molasses passed vertically through the vessel. By controlling the outlet valve, the rate of flow of the molasses through the exchanger is so regulated that the desired period of contact between the molasses being refined and the base exchanger is established.

The molasses after treatment with the base exchanger is preferably decolorized, as by animal or vegetable carbon in usual manner.

In any case, the treated molasses are subjected to acid conversion so as to transform a large part of the maltose and dextrins therein to dextrose.

The thus converted molasses are neutralized, concentrated say to about 39 to 40° Bé. and cooled to crystallize a dextrose fraction which is separated from the remaining mother liquor as described previously. This second portion of mother liquor separated from dextrose is retreated as described.

Preferably, however, the refined molasses are not treated separately but are remixed into the system with fresh starch to be converted, so that the molasses go through the same sequence of steps as does fresh starch, beginning with the acid conversion.

This combining of the refined molasses with starch is made possible because, in the molasses treated with the base exchanger, there are not present materials which interfere to an objectionable extent with the conversion or subsequent crystallization of the dextrose.

While it is considered that the exchange of hydrogen of the base exchanger for metals present in the form of their dissolved salts in the molasses is a chief factor in the molasses refining operation, the invention is not limited to any theory of explanation of the results obtained. The invention makes use on the other hand of all results obtained by the method described which result in the refining of the molasses so that it may be converted by acid with a good yield of dextrose and without the introduction of excessive amounts of bitter or otherwise objectionable materials, whether the refined molasses are converted by themselves or are mixed with fresh starch before conversion.

By following the method described and particularly that in which the wash water is returned to the light liquor decolorizer and the molasses are returned to the make-up tank for fresh starch, we have obtained practically theoretical yields of crystallized dextrose from starch.

For some purposes, the alkali metal alkali in the neutralization step following conversion may be replaced by finely divided calcium carbonate, lime, magnesia, or like alkali. In such a case, the base exchanger treatment applied to the resulting molasses removes the calcium, magnesium, or other metal added in the neutralization, with attendant improvement in yield of dextrose of satisfactory quality when the purified molasses are returned to conversion and reworked, as described above.

When compounds of metals other than the alkali metals are used for the neutralization after conversion, the acid selected for use in making the conversion should be one whose salts with calcium, magnesium, and like metals are soluble. Thus, the acid used may be hydrochloric, acetic, or nitric acid, the latter if used being added in very dilute form.

It will be understood that the details given are for the purpose of illustration and that variations within the spirit of the invention are intended to be included within the scope of the appended claims.

What we claim is:

1. The method of converting starch of starchy materials substantially completely to crystallized dextrose which comprises converting the starch to dextrose and other products by hydrolysis in the presence of water and acid, treating the resulting conversion syrup with an alkali to increase the pH and coagulate proteins and other coagulable substances, the said acid and alkali used being ones that on reaction with each other give only a salt that is soluble in water, removing the coagulated material, decolorizing and concentrating the remaining liquor so as to give a concentrated refined syrup, crystallizing dextrose from the concentrated syrup, separating mother liquor as crude molasses from the crystallized dextrose, treating the separated molasses with a base exchanger adapted to remove metals from an aqueous solution of salts of the metals and replace the said metals by hydrogen, so as to effect reduction of the content of metals in the molasses, separating the base exchanger from the treated molasses, subjecting the treated molasses to the aforesaid steps beginning with the acid conversion and repeating the cycle of steps until substantially all the starch conversion products are obtained as crystallized dextrose, the removal of metals by the exchanger serving to improve the conversion of the molasses to dextrose.

2. The method of converting corn starch substantially completely to crystallized dextrose which comprises converting the starch to dextrose and other products by hydrolysis in the presence of water and acid, treating the resulting conversion syrup with an alkali to increase the pH and coagulate proteins and other coagulable substances, the said acid and alkali used being ones that on reaction with each other give only a salt that is soluble in water, removing the coagulated material, decolorizing and concentrating the remaining liquor so as to give concentrated refined syrup, crystallizing dextrose from the concentrated syrup, separating mother liquor as crude molasses from the crystallized dextrose, treating the separated molasses with a base exchanger adapted to remove metals from an aqueous solution of salts of the metals and replace the said metals by hydrogen, so as to effect reduction of the content of metals in the molasses, separating the base exchanger from the treated molasses, mixing the treated molasses with fresh starch suspension, and repeating the aforesaid sequence of steps beginning with converting the starch, the removal of metals by the exchanger serving to improve the conversion of the molasses to dextrose.

3. The method described in claim 2, the alkali used being an alkali metal compound, the base exchanger removing alkali metal and other metals from the crude molasses, and the molasses being diluted to about 12 to 16° Bé. before being contacted with the base exchanger.

4. The method described in claim 1, the base exchanger used being an activated organic material, the treatment of the molasses with the base exchanger being effected at a temperature between about 125 and 175° F., and the treatment being continued for a substantial period of time until the activated organic material has removed the major portion of the metals from the molasses.

5. The method described in claim 1, the alkali used to treat the said conversion syrup and increase the pH being calcium hydroxide and the acid used initially to effect the conversion of the starch to dextrose and other products by hydrolysis being hydrochloric acid so that there is avoided precipitation of calcium when the calcium hydroxide is added and during concentrating of the syrup.

JAMES F. WALSH.
JAMES DUDICKER.